United States Patent
Vogt et al.

(10) Patent No.: US 8,751,796 B2
(45) Date of Patent: Jun. 10, 2014

(54) METHOD AND APPARATUS FOR USE IN A COMMUNICATIONS NETWORK

(75) Inventors: Christian Vogt, San Jose, CA (US); Shinta Sugimoto, Kanagawa (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 470 days.

(21) Appl. No.: 12/738,694

(22) PCT Filed: Sep. 18, 2008

(86) PCT No.: PCT/EP2008/062461
§ 371 (c)(1),
(2), (4) Date: Jul. 22, 2010

(87) PCT Pub. No.: WO2009/049985
PCT Pub. Date: Apr. 23, 2009

(65) Prior Publication Data
US 2010/0287371 A1    Nov. 11, 2010

(30) Foreign Application Priority Data
Oct. 17, 2007  (GB) .................................... 0720283.1

(51) Int. Cl.
*H04L 29/06*  (2006.01)
(52) U.S. Cl.
USPC ........................................................ 713/162
(58) Field of Classification Search
USPC ........................................................ 713/162
See application file for complete search history.

(56) References Cited

U.S. PATENT DOCUMENTS

| | | | |
|---|---|---|---|
| 7,370,197 B2 * | 5/2008 | Huitema ....................... | 713/162 |
| 2004/0179508 A1 * | 9/2004 | Thubert et al. ................ | 370/349 |
| 2006/0104243 A1 * | 5/2006 | Park .............................. | 370/331 |
| 2006/0253704 A1 * | 11/2006 | Kempf et al. ................. | 713/158 |
| 2008/0205653 A1 * | 8/2008 | Haddad ......................... | 380/278 |
| 2008/0285518 A1 * | 11/2008 | Dutta et al. ................... | 370/331 |
| 2009/0016364 A1 * | 1/2009 | Krishnan ...................... | 370/401 |
| 2009/0073935 A1 * | 3/2009 | Xia et al. ...................... | 370/331 |
| 2009/0122750 A1 * | 5/2009 | Sarikaya ....................... | 370/328 |

OTHER PUBLICATIONS

Aura, "Cryptographically Generated Addresses (CGA)", RFC 3972, Mar. 2005, all pages.*
Arkko et al., "Enhanced Route Optimization for Mobile IPv6", Feb. 2007, all pages.*
Qin A. et al. PMIPv6 Route Optimization Protocol. Draft-qin-mipshop-pmipro.00.txt. Network Working Group. Feb. 25, 2007.

* cited by examiner

*Primary Examiner* — Michael S McNally

(57) ABSTRACT

A method and apparatus for use in a Proxy Mobile IP communications network. An anchor point function serves at least one mobile host. The anchor point function generates an IP address for use by the mobile host, the address being generated using cryptographic materials owned by the anchor point function. The anchor point function can then perform signalling on behalf of the mobile host, using the IP address generated for the mobile host and at least part of the cryptographic materials used to generate the IP address.

14 Claims, 4 Drawing Sheets

METHOD AND APPARATUS FOR USE IN A COMMUNICATIONS NETWORK

TECHNICAL FIELD

The present invention relates to a method and apparatus for use in a communications network, and in particular to a method and apparatus for use in a Proxy Mobile IP network.

BACKGROUND

There are two main techniques for mobility support in IP, as follows:
  Bidirectional tunnelling: A mobile host connects to a stationary anchor point with a bidirectional tunnel. The host communicates through the tunnel via a stable IP address from the anchor point's link. The IP address that terminates the tunnel on the mobile-host side at any given point in time is called the mobile host's on-link IP address.
  Route optimization: The mobile host communicates via a direct path to a correspondent host. Packets are routed via the mobile host's on-link IP address. IP address substitution at the mobile host's and correspondent host's IP layers ensures that higher protocol layers see the mobile host's stable IP address instead of the variable on-link IP address.

Both bidirectional tunnelling and route optimization require extra mobility functionality on mobile hosts. This increases the complexity of host implementations and makes mobility support for legacy hosts difficult. Proxy-based IP mobility protocols are being developed to mitigate this. Such protocols do not require mobility functionality to be at the mobile host, but instead at an access router used by the mobile host. The mobile host's access router therefore becomes a proxy of the mobile host, and one of its IP addresses is used as the mobile host's on-link IP address. The access router therefore handles the mobile host's mobility signalling, and ideally the mobile host should not be aware that it is using a proxy-based IP mobility protocol. Proxy Mobile IPv6 (Sri Gundavelli et al.: Proxy Mobile IPv6, draft-ietf-netlmm-proxymip6-18) is currently the main proxy-based IP mobility protocol.

The base specification of Proxy Mobile IPv6 uses bidirectional tunnelling. However, bidirectional tunnelling increases bandwidth utilization and packet propagation delays, due to a sub-optimal packet route via an anchor point. Efforts are underway to extend Proxy Mobile IPv6 to use route optimization (see, for example, Behcet Sarikaya et al.: PMIPv6 Route Optimization Protocol, draft-qin-netlmm-pmipro-00, and Julien Abeille, Marco Liebsch: Route Optimization for Proxy Mobile IPv6, draft-abeille-netlmm-proxymip6ro-00).

Route optimization requires a mobile host to prove to a correspondent host that it is the legitimate user of its stable IP address. This so-called "IP address ownership proof" in general must operate without a pre-existing security or trust relationship between the mobile host and the correspondent host.

One of the main protocols for route optimization in Mobile IPv6, Enhanced Route Optimization (see Jari Arkko, Christian Vogt, Wassim Haddad: Enhanced Route Optimization for Mobile IPv6, RFC 4866), enables a mobile host to prove ownership of its stable IP address by means of generating the stable IP address cryptographically. Specifically, the stable IP address is a function of the public component of the mobile host's public/private key pair, and the mobile host proves ownership of the stable IP address by presenting evidence that it knows the respective private component.

Unfortunately, using the methodology of Enhanced Route Optimization in a Proxy Mobile IPv6 scenario would require the mobile host's access router to learn the mobile host's private key, and it would require the transfer of the mobile host's private key across access routers as the mobile host moves. This would put the mobile host's public key at an increased risk of compromise and is hence unacceptable from a security perspective.

Some attempts have been made to address this problem. For example, Sarikaya et al.: PMIPv6 Route Optimization Protocol, draft-qin-netlmm-pmipro-00, specifies a proxy-based route optimization solution based on Enhanced Route Optimization. It directly moves the mobile host's mobility functionality to the access router, and requires a mobile host's access router to learn the mobile host's private key. It also requires the transfer of the mobile host's private key between access routers as the mobile host moves. Neither of these requirements are desirable from a security point of view.

Julien Abeille, Marco Liebsch: Route Optimization for Proxy Mobile IPv6, draft-abeille-netlmm-proxymip6ro-00, provides support for route optimization only if both the mobile host and the correspondent host are located in a Proxy Mobile IPv6 domain. The advantage of this is that a pre-existing security and trust relationship can be assumed to exist between the proxies of the mobile host and the correspondent host. This relationship is utilized for IP address ownership proofs. The disadvantage of requiring a correspondent host to be in a Proxy Mobile IPv6 domain is that it limits the set of correspondent hosts for which communications can be route-optimized. Correspondent hosts with support for RFC4866 that are not in a Proxy Mobile IPv6 domain are not supported.

Sangjin Jeong, Ryuji Wakikawa: Route Optimization Support for Proxy Mobile IPv6 (PMIPv6), draft-jeong-netlmm-ro-support-for-pmip6-00 considers route optimization with correspondent hosts within a Proxy Mobile IPv6 domain, and correspondent hosts outside a Proxy Mobile IPv6v domain. For the former case, security and trust relationships are assumed to exist between the proxies of the mobile host and the correspondent host. This has the same disadvantages as in Julien Abeille, Marco Liebsch: Route Optimization for Proxy Mobile IPv6, draft-abeille-netlmm-proxymip6ro-00. For the latter case, route optimization is achieved based on the security design of Mobile IPv6 (see David B. Johnson, Charles E. Perkins, Jari Arkko: Mobility Support in IPv6, RFC 3775). This is secure, but produces long handover delays, and incurs a high signalling overhead.

SUMMARY

The inventors have devised a way to improve security in a Proxy mobile network such as a PMIPv6 network, in which a mobile host is assigned a stable IP address that is generated and owned by its anchor point. This can be used to provide secure support for Enhanced Route Optimization According to a first aspect of the present invention, there is provided a method for use in a Proxy Mobile IP communications network. An anchor point function serves at least one mobile host. The anchor point function generates an IP address for use by the mobile host, the address being generated using cryptographic materials owned by the anchor point function. The anchor point function can then perform signalling on behalf of the mobile host, using the IP address generated for the mobile host and at least part of the cryptographic materials used to generate the IP address.

The method optionally comprising using a modifier value specific to the mobile host, in combination with the cryptographic materials to generate the IP address. In this way an IP address can be generated for a plurality of mobile hosts served by the anchor point by using a different modifier for each mobile host.

As an option, the method further comprises comparing the generated IP address of the mobile host with IP addresses previously generated by the anchor point, and in the event that the generated IP address of the mobile host is the same as a previously generated IP address, using a further modifier value to generate a further IP address. This prevents two mobile hosts from being allocated the same IP address.

The cryptographic materials optionally comprise a public/private key pair owned by the anchor point function. In this case, the method optionally comprises providing the public key of the anchor point function to a remote node, the public key to be used by the remote node to authenticate the mobile host's IP address.

In an optional embodiment, the method comprises performing Enhanced Route Optimization with a correspondent node using the generated IP address.

In this case, the method optionally comprise receiving a temporary home keygen token from a correspondent node, and sending the temporary home keygen token, the mobile host's IP address, and at least part of the cryptographic materials to the correspondent node, the cryptographic materials for use in authenticating the mobile host's IP address. A Care-of keygen token is received from the correspondent node, and the anchor point sends on behalf of the mobile host, a Binding Update message to the correspondent node, the Binding Update message comprising the temporary home keygen token, the Care-of keygen token in the case of a complete Binding Update message, and at least part of the cryptographic materials, the cryptographic materials for use in authenticating the mobile host's IP address;

Optionally, the method further comprises sending a permanent home keygen token, the mobile host's IP address, and at least part of the cryptographic materials to the correspondent node, receiving a further Care-of keygen token from the correspondent node, and sending from the anchor point on behalf of the mobile host, a Binding Update message to the correspondent node, the Binding Update message comprising the permanent home keygen token, the further Care-of keygen token in the case of a complete Binding Update message, and at least part of the cryptographic materials, the cryptographic materials for use in authenticating the mobile host's IP address;

According to a second aspect of the invention, there is provided an anchor point function for use in a proxy mobile communications network. The anchor point function comprises a receiver for communicating with at least one mobile host served by the anchor point function, a processor for generating an IP address for use by the at least one mobile host, wherein the IP address being generated at least in part using cryptographic materials owned by the anchor point function. The anchor point function is also provided with a transmitter for sending signalling on behalf of the mobile host. The signalling uses the IP address generated for the mobile host and at least part of the cryptographic materials used to generate the IP address.

As an option, the processor is arranged to use a modifier value specific to the mobile host, in combination with the cryptographic materials.

In order to prevent collision of the generated IP address with an IP address already in use, the processor is optionally arranged to compare the generated IP address of the mobile host with IP addresses previously generated by the anchor point, and further arranged to, in the event that the generated IP address of the mobile host is the same as a previously generated IP address, use a further modifier value to generate a further IP address.

Optionally, the cryptographic materials comprise a public/private key pair owned by the anchor point function. In this case, the anchor point function further comprises a second transmitter for sending the public key of the anchor point function to a remote node, the public key to be used by the remote node to authenticate the mobile host's IP address.

The anchor point function optionally comprises a second receiver for receiving a temporary home keygen token from a correspondent node and a third transmitter for transmitting the temporary home keygen token, the mobile host's IP address, and at least part of the cryptographic materials to the correspondent node, the cryptographic materials for use in authenticating the mobile host's IP address. There is also provided a third receiver for receiving a Care-of keygen token from the correspondent node, and a fourth transmitter for sending, on behalf of the mobile host, a Binding Update message to the correspondent node, the Binding Update message comprising the temporary home keygen token, the Care-of keygen token in the case of a complete Binding Update message, and at least part of the cryptographic materials, the cryptographic materials for use in authenticating the mobile host's IP address;

Optionally, the anchor point function further comprises a fifth transmitter for sending a permanent home keygen token, the mobile host's IP address, and at least part of the cryptographic materials to the correspondent node, and a fourth receiver for receiving a further Care-of keygen token from the correspondent node. There is also provided a sixth transmitter for sending, on behalf of the mobile host, a Binding Update message to the correspondent node, the Binding Update message comprising the permanent home keygen token, the further Care-of keygen token in the case of a complete Binding Update message, and at least part of the cryptographic materials, the cryptographic materials for use in authenticating the mobile host's IP address;

According to a third aspect of the invention, there is provided an access router for use in a Proxy Mobile IP communications network, the access router comprising a receiver that is used for receiving, from an anchor point function, signalling relating to a mobile host served by the anchor point function. A transmitter is also provided for forwarding the signalling to a correspondent node, the signalling comprising packets defining an IP source address as an IP address generated by the anchor point for use by the mobile node, the IP address having been generated at least in part using cryptographic materials owned by the anchor point.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using a non-limiting example application to mobile communication networks configured in a tree type network topology, this technology has application to any communications network application. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Generation and Ownership of Stable IP Addresses

Prior to receiving mobility support, a mobile host is assigned a stable IP address from its anchor point. The stable IP address is generated and owned by the anchor point, but it is used only by the mobile host. The IP address is a self-certifying identifier, which is cryptographically generated from a key pair owned by the anchor point. The IP address is used as a communication endpoint by applications running on the mobile host The anchor point cryptographically generates the stable IP address as described in Tuomas Aura: Cryptographically Generated Addresses (CGA), RFC 3972. The anchor point uses its own public/private key pair for this. By varying a modifier value during the IP address generation process, the anchor point is able to generate different IP addresses for multiple mobile hosts from a single public/private key pair. In the unlikely case that a newly generated IP address collides with an IP address previously generated for a different mobile host, the anchor point discards the new IP address and generates another one using a fresh modifier value.

The mechanism by which the stable IP address generated by the anchor point is communicated to the mobile host is outside of the scope of the present invention.

As the anchor point owns the cryptographic materials from which the IP address is generated, it is possible for the anchor point to provide evidence of IP address ownership to a third party on behalf of the mobile host.

Figure 1:
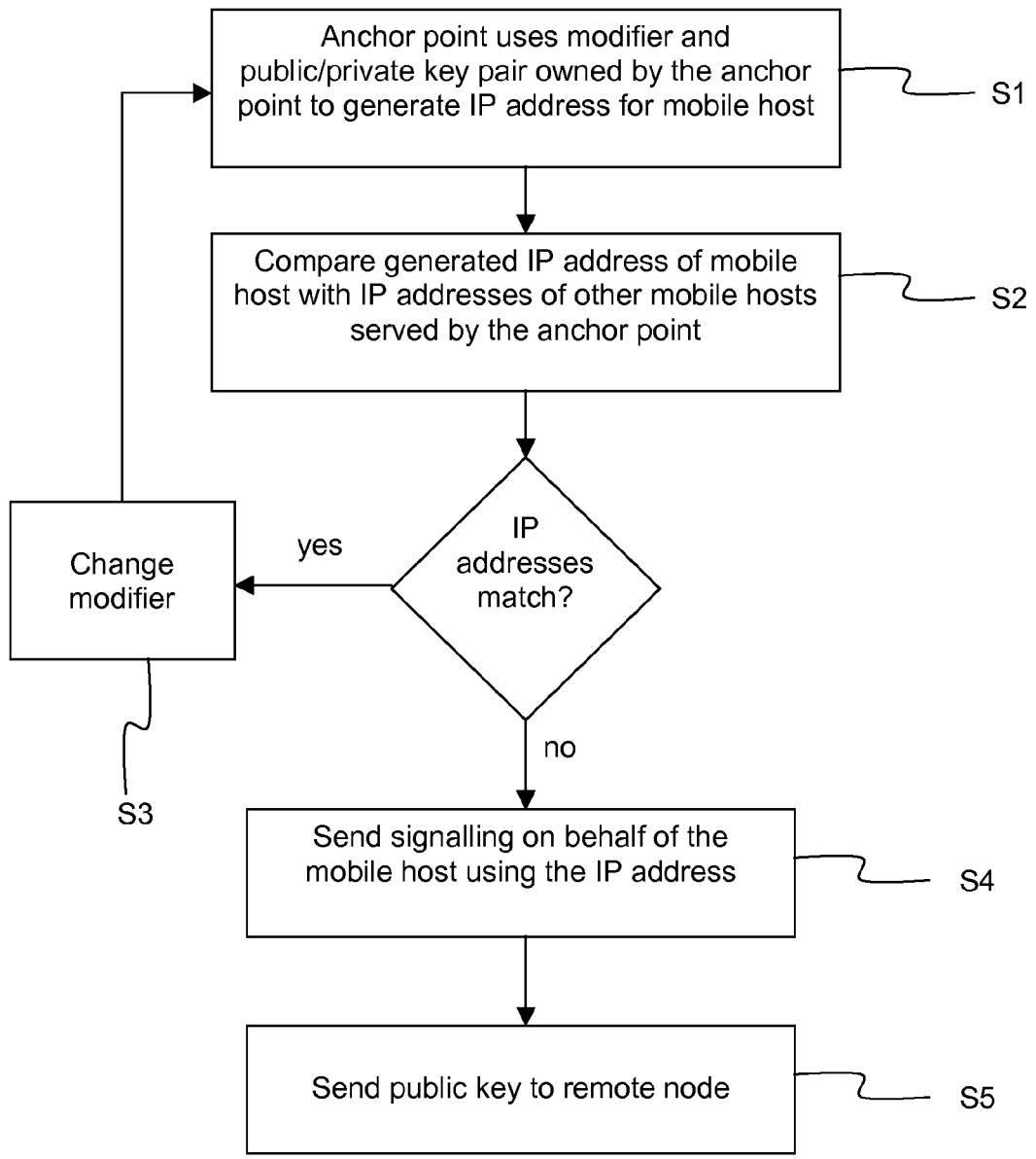
FIG. 1 is a flow diagram illustrating the steps of an embodiment of the invention.

The main steps of the generation of the IP address are shown in FIG. 1, with the following numbering corresponding to the numbering used in FIG. 1.

S1. When a mobile host registers for the first time with an anchor point via an access router, the anchor point uses its public/private key pair and a modifier to generate an IP address for use when sending signalling on behalf of the mobile host, or for the mobile host to use directly.

S2. The generated IP address is compared with other IP addresses generated by the anchor point.

S3. If the generated IP address matches any other IP address, then the generated IP address is discarded, the modifier changed, and a new IP address is generated.

S4. When the generated IP address is unique, it can be used by or on behalf of the mobile host.

S5. The anchor point's public key is sent to a remote node, and can be used by the remote node to authenticate the mobile host's IP address.

In the case where the anchor point functionality is provided by multiple physical entities, then an anchor point entity generating an IP address may also check, as part of step 2, whether the same IP address has been generated by another anchor point entity. In this case, the generated IP address is discarded and a new IP address if generated.

Proxy Mobile IPv6 Variant with Route Optimization Support

For route optimization support in Proxy Mobile IP, it is advantageous for private keys to remain unknown to nodes other than the owner of the private key. In this case, the node in question is the anchor point, and private keys do not need to be transferred.

Enhanced Route Optimization differentiates between an initial registration of a mobile host's on-link IP address with a correspondent host and subsequent registrations. During the initial registration, the correspondent host generates a permanent home keygen token, which allows subsequent registrations to be transacted more efficiently.

The protocol described henceforth is based on the message exchanges of Enhanced Route Optimization, specified in [RFC4866]. The difference is that, in [RFC4866], the mobile host itself pursues a registration, whereas according to the present invention, a registration is pursued by an anchor point on behalf of a mobile host, partly with assistance from the mobile host's access router.

Assumption: The protocol described henceforth is based on the assumption that an anchor point maintains a list of correspondent hosts that a mobile host is communicating with. Typically, a mobile host communicates via bidirectional tunnelling before this communication is switched to route optimization. The anchor point may leverage this communication to build a list of correspondent hosts with which the mobile host communicates.

1. Initial Registration

Figure 2:
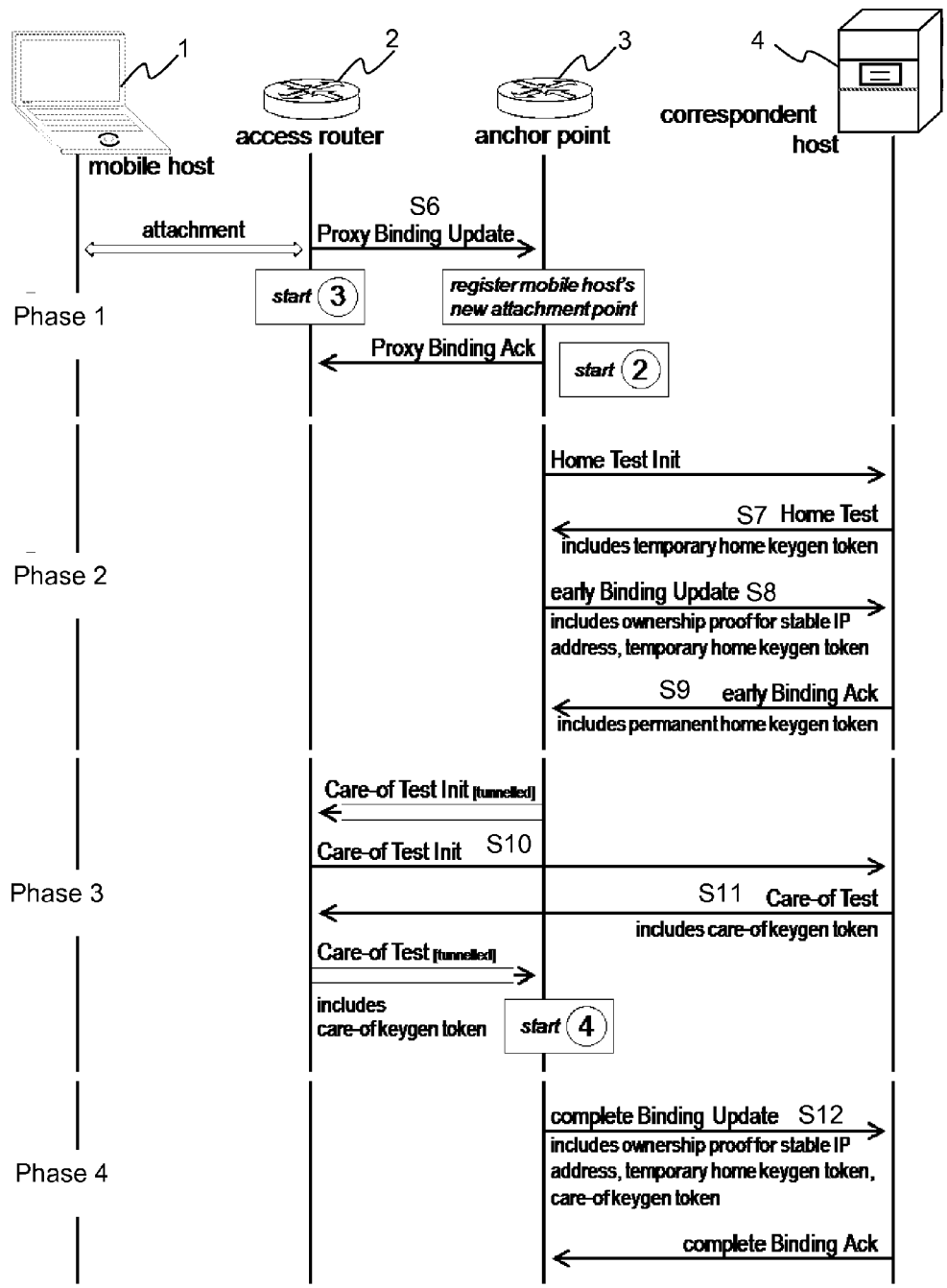
FIG. 2 illustrates schematically the signalling when a mobile host registers with a proxy mobile communications network according to an embodiment of the invention.

The initial registration of a mobile host 1 consists of four phases, which typically overlap partly. These phases are illustrated in FIG. 2, in which as mobile host 1, an access router 2, an anchor point 3 and a correspondent host 4 are shown.

Phase 1: When the mobile host 1 attaches to an access router 2 for the first time, the access router 2 initiates an exchange (S6) of Proxy Binding Update and Proxy Binding Acknowledgment messages with the mobile host's anchor point 3, as specified in Sri Gundavelli et al.: Proxy Mobile IPv6, draft-ietf-netlmm-proxymip6-18. The anchor point 3 registers the new attachment point of the mobile host 1 and triggers phases 2 and 3 for each correspondent host 4 with which the mobile host 6 has recently communicated.

Phase 2: For each correspondent host 4 that the mobile host has recently communicated with, the anchor point 3 obtains (S7) a temporary home keygen token from each correspondent host 4 through the exchange of Home Test Init and Home Test messages. The anchor point 3 then registers the mobile host's on-link IP address with the correspondent host with the exchange of early Binding Update (S8) and Binding Acknowledgment (S9) messages. The early Binding Update message (S8) includes the temporary home keygen token and an ownership proof for the mobile host's stable IP address. The anchor point 3 can provide the ownership proof for the stable IP address based on its knowledge of the private component of the public/private key pair with which the stable IP address was generated. The early Binding Acknowledgment (S9) includes a permanent home keygen token, which the anchor point 3 stores for use during subsequent registrations.

Phase 3: For each correspondent host 4 with which the mobile host 1 has recently communicated, the anchor point 3 obtains a care-of keygen token through the exchange of Care-of Test Init (S10) and Care-of Test (S11) messages. These messages, respectively, are required to be sourced from and destined to the mobile host's 1 on-link IP address. The messages are therefore tunnelled through the mobile host's 1 current access router 2.

Phase 4: When the anchor point 3 receives a Care-of Test message back from a correspondent host 4, it extracts the included care-of keygen token and sends a complete Binding Update message (S12) to the correspondent host 4 on behalf of the mobile host 1. The complete Binding Update message (S12) includes the care-of keygen token from the Care-of Test message (S11) in addition to the contents of the early Binding Update message (S8) that was sent previously.

2. Subsequent Registrations

Figure 3:
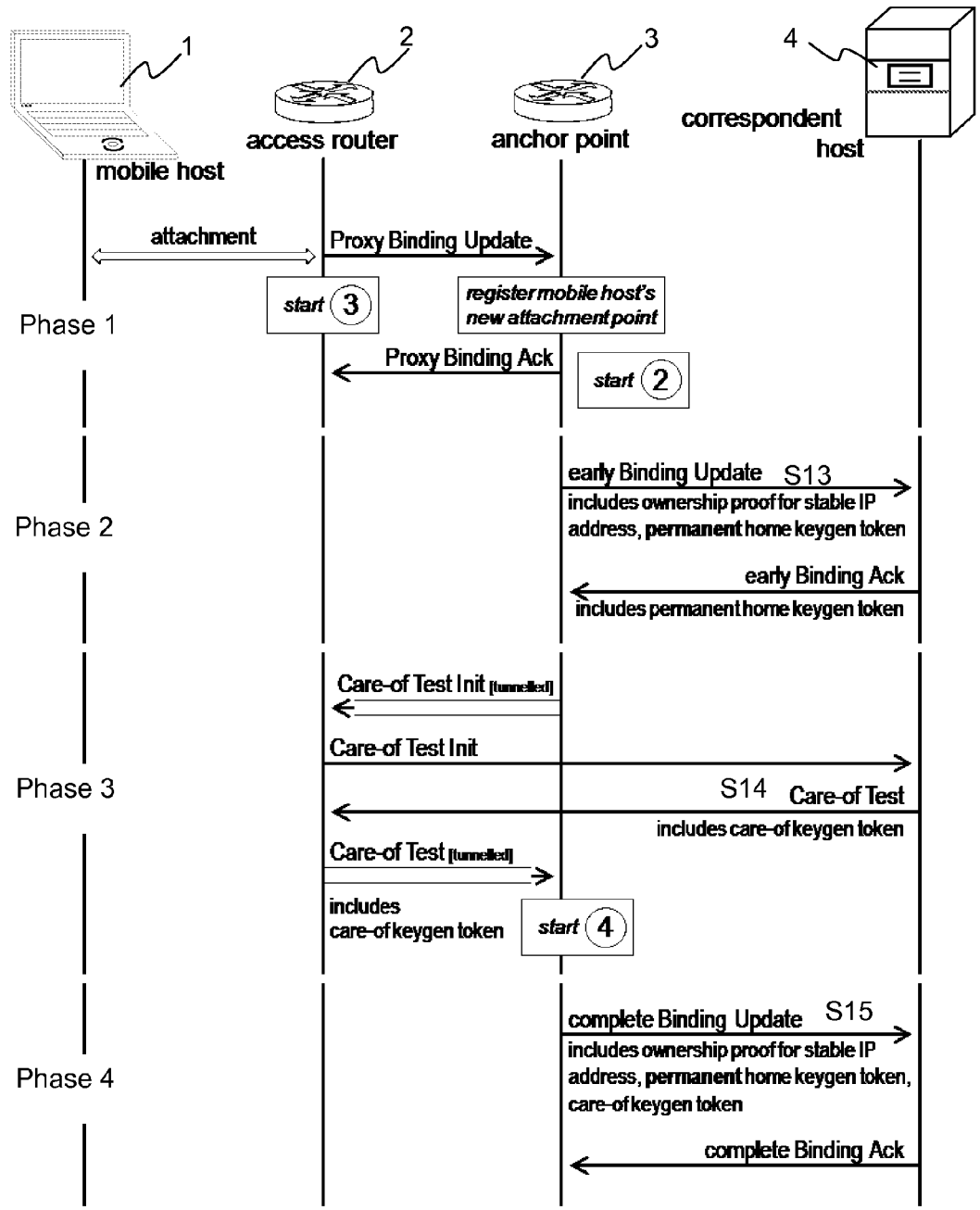
FIG. 3 illustrates schematically the signalling when a mobile host re-registers with a proxy mobile communications network according to an embodiment of the invention.

FIG. 3 illustrates the messages exchanged during subsequent registrations. Subsequent registrations differ from the initial registration only in that the anchor point 3 can send early and complete Binding Update messages (S13, S15), in phases 2 and 4 respectively, using the permanent home keygen token obtained from the initial registration. The exchange of Home Test Init and Home Test messages is omitted in this case. However, a care-of keygen token is obtained in a Care-of Test message (S14) sent form the correspondent host 4 to the anchor point 3 via the access router 2.

Figure 4:
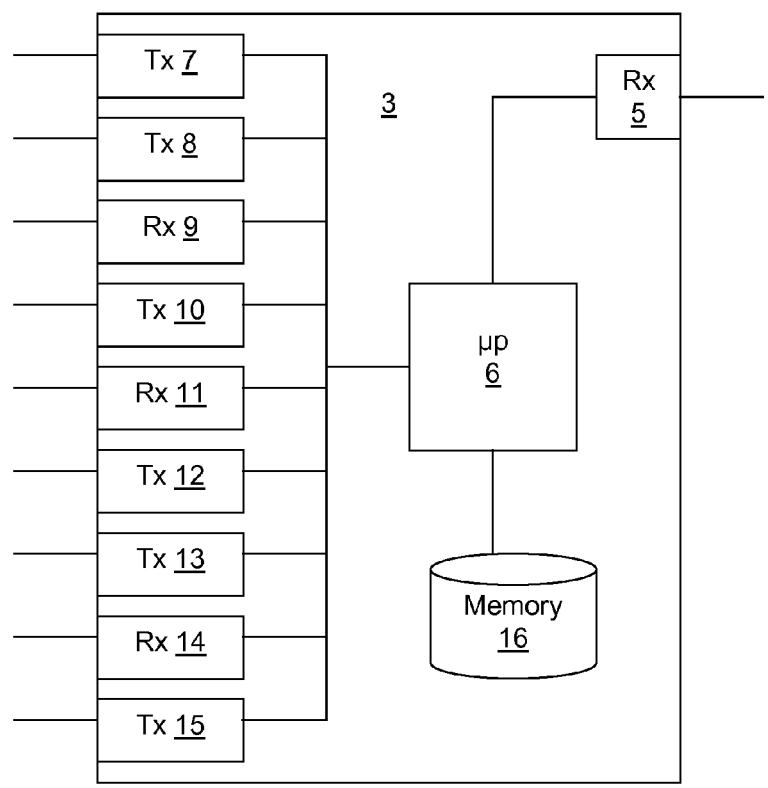
FIG. 4 illustrates schematically in a block diagram an anchor point node for use in a Proxy Mobile IPv6 network according to an embodiment of the invention.

Turning now to FIG. 4, there is illustrated an anchor point function 3 according to an embodiment of the invention. The anchor point 3 is provided with a receiver 5 for communicating with the mobile host 1. A processor 6 is used to generate the IP address using the anchor point's cryptographic materials. The processor, in a specific embodiment of the invention, also uses a modifier value specific to the mobile host when generating the IP address. In a further specific embodiment, the processor 6 is also arranged to perform a comparison of the generated IP address, and if a collision is detected with previously generated IP addresses, the processor is arranged to use a different modifier value to generate a new IP address. A transmitter 7 is provided for sending messages on behalf of the mobile host 1 using the generated IP address. A second transmitter 8 may also be provided for sending the anchor point's 3 public key to a correspondent host.

Where the anchor point is used in Enhanced Route Optimization, it also includes a second receiver 9 for receiving the temporary home keygen token from the correspondent host 4. It is also provided with a third transmitter 10 for sending the temporary home keygen token along with the IP address of the mobile host 1, and the public key to the correspondent host 4. A third receiver 11 is provided for receiving a Care-of keygen token from the correspondent host 4. A fourth transmitter 12 is provided for sending the Binding Update message shown in S12 of FIG. 2. The anchor point may further be provided with a fifth transmitter 13 for sending the early Binding Update shown in S13 of FIG. 3, and a fourth receiver 14 for receiving the Care-of Test message S14 from the correspondent node. A sixth transmitter 15 is provided fro sending to the correspondent host 4 the Binding Update message shown in step S15. Of course, the transmitters and receivers described above are described in terms of their function only. They may be embodied in a single transceiver, a plurality of transceivers, or as separate transmitters and receivers. Note also that the access point 3 is typically provided with a memory 16 for storing IP addresses for referring to when a comparison to avoid a collision is made.

Figure 5:
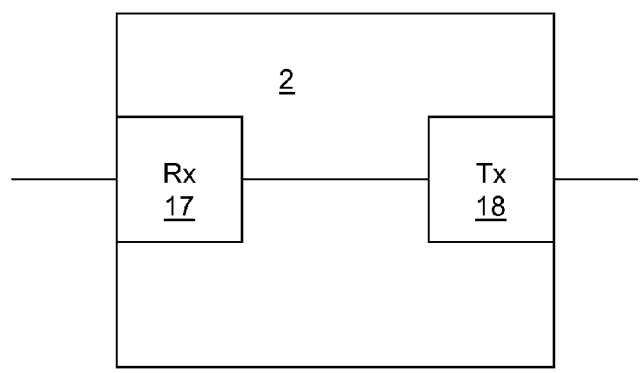
FIG. 5 illustrates schematically in a block diagram an access router according to an embodiment of the invention.

FIG. 5 illustrates an access router 2 according to an embodiment of the invention. The access router 2 is provided with a receiver 17 signalling relating to the mobile host 1 from the anchor point 1, and a transmitter 18 for forwarding the signalling to the correspondent node 4.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined only by the claims. The extent of legal protection is defined by the words recited in the allowed claims and their equivalents.

The invention claimed is:

1. A method for use in a Proxy Mobile Internet protocol (IP) communications network, the method comprising:
   at an anchor point function serving at least one mobile host through a remote access router, generating an IP address for use by the mobile host, the IP address being generated at least in part using cryptographic materials solely owned by the anchor point, wherein the cryptographic materials comprise a public/private key pair owned by the anchor point function; and
   performing, at the anchor point function, signaling on behalf of the mobile host, using the IP address generated for the mobile host and at least part of the cryptographic materials used to generate the IP address.

2. The method according to claim 1, further comprising using a modifier value specific to the mobile host, in combination with the cryptographic materials to generate the IP address.

3. The method according to claim 2, further comprising:
   i. comparing the IP address of the mobile host with IP addresses previously generated by the anchor point; and
   ii. in the event that the IP address of the mobile host is the same as a previously generated IP address, using a further modifier value to generate a further IP address and repeating steps i and ii.

4. The method according to claim 1, further comprising:
   providing the public key of the anchor point function to a remote node, the public key to be used by the remote node to authenticate the IP address of the mobile host.

5. The method according to claim 1, further comprising using the IP address to perform Enhanced Route Optimization with a correspondent node.

6. The method according to claim 5, further comprising:
   receiving a temporary home keygen token from a correspondent node;
   sending the temporary home keygen token, the IP address of the mobile host, and at least part of the cryptographic materials to the correspondent node, the cryptographic materials for use in authenticating the IP address of the mobile host;
   receiving a Care-of keygen token from the correspondent node; and
   sending from the anchor point on behalf of the mobile host, a Binding Update message to the correspondent node, the Binding Update message comprising the temporary home keygen token, the Care-of keygen token in case of a complete Binding Update message, and at least part of the cryptographic materials, the cryptographic materials for use in authenticating the IP address of the mobile host.

7. The method according to claim 6, further comprising:
   sending a permanent home keygen token, the IP address of the mobile host, and at least part of the cryptographic materials to the correspondent node;
   receiving a further Care-of keygen token from the correspondent node; and
   sending from the anchor point on behalf of the mobile host, a Binding Update message to the correspondent node, the Binding Update message comprising the permanent home keygen token, the further Care-of keygen token in the case of a complete Binding Update message, and at least part of the cryptographic materials, the cryptographic materials for use in authenticating the IP address of the mobile host.

8. An anchor point function for use in a proxy mobile communications network, the anchor point function serving at least one mobile host through a remote access router, comprising:
   a receiver for communicating with the at least one mobile host served by the anchor point function through the remote access router;
   a processor for generating an Internet protocol (IP) address for use by the at least one mobile host, the IP address being generated at least in part using cryptographic materials solely owned by the anchor point function, wherein the cryptographic materials comprise a public/private key pair owned by the anchor point function; and
   a transmitter for sending signaling on behalf of the mobile host, the signaling using the IP address generated for the mobile host and at least part of the cryptographic materials used to generate the IP address.

9. The anchor point function according to claim 8, wherein the processor is arranged to use a modifier value specific to the mobile host in combination with the cryptographic materials to generate the IP address.

10. The anchor point function according to claim 9, wherein the processor is further arranged to compare the IP address of the mobile host with IP addresses previously generated by the anchor point and, in the event that the IP address of the mobile host is the same as a previously generated IP address, the processor is arranged to use a further modifier value to generate a further IP address.

11. The anchor point function according to claim 8, further comprising:
   a second transmitter for sending the public key of the anchor point function to a remote node, the public key to be used by the remote node to authenticate the IP address of the mobile host.

12. The anchor point function according to claim 8, further comprising:
   a second receiver for receiving a temporary home keygen token from a correspondent node;
   a second transmitter for transmitting the temporary home keygen token, the IP address of the mobile host, and at least part of the cryptographic materials to the correspondent node, the cryptographic materials for use in authenticating the IP address of the mobile host;
   a third receiver for receiving a Care-of keygen token from the correspondent node; and
   a third transmitter for sending, on behalf of the mobile host, a Binding Update message to the correspondent node, the Binding Update message comprising the temporary home keygen token, the Care-of keygen token in the case of a complete Binding Update message, and at least part of the cryptographic materials, the cryptographic materials for use in authenticating the IP address of the mobile host.

13. The anchor point function according to claim 12, further comprising:
   a fourth transmitter for sending a permanent home keygen token, the IP address of the mobile host, and at least part of the cryptographic materials to the correspondent node;
   a fourth receiver for receiving a further Care-of keygen token from the correspondent node; and
   a fifth transmitter for sending, on behalf of the mobile host, a Binding Update message to the correspondent node, the Binding Update message comprising the permanent home keygen token, the further Care-of keygen token in the case of a complete Binding Update message, and at least part of the cryptographic materials, the cryptographic materials for use in authenticating the IP address of the mobile host.

14. An access router for use in a Proxy Mobile Internet protocol (IP) communications network, the access router comprising:
   a receiver for receiving from an anchor point function remote from the access router signaling relating to a mobile host served by the anchor point function; and
   a transmitter for forwarding the signaling to a correspondent node, the signaling comprising packets defining an IP source address as an IP address generated by the anchor point for use by the mobile host, the IP address having been generated at least in part using cryptographic materials solely owned by the anchor point, wherein the cryptographic materials comprise a public/private key pair owned by the anchor point function.

* * * * *

UNITED STATES PATENT AND TRADEMARK OFFICE
CERTIFICATE OF CORRECTION

Page 1 of 1

PATENT NO.        : 8,751,796 B2
APPLICATION NO.   : 12/738694
DATED             : June 10, 2014
INVENTOR(S)       : Vogt et al.

It is certified that error appears in the above-identified patent and that said Letters Patent is hereby corrected as shown below:

In the Specification:

In Column 6, Line 43, delete "mobile host 6" and insert -- mobile host 1 --, therefor.

In Column 7, Line 49, delete "fro" and insert -- for --, therefor.

In Column 7, Line 61, delete "anchor point 1," and insert -- anchor point 3, --, therefor.

Signed and Sealed this
Sixteenth Day of September, 2014

Michelle K. Lee
*Deputy Director of the United States Patent and Trademark Office*